(12) United States Patent
Schupbach

(10) Patent No.: US 9,333,936 B2
(45) Date of Patent: May 10, 2016

(54) METHOD FOR INJECTION MOLDING OF AN AIRBAG CASE

(71) Applicant: Faurecia Interieur Industrie, Nanterre (FR)

(72) Inventor: Thierry Schupbach, Saint Crepin Ibouvilliers (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/304,040

(22) Filed: Jun. 13, 2014

(65) Prior Publication Data

US 2014/0375026 A1   Dec. 25, 2014

(30) Foreign Application Priority Data

Jun. 24, 2013   (FR) ...................................... 13 56018

(51) Int. Cl.
*B29C 45/14* (2006.01)
*B60R 21/215* (2011.01)
*B60R 21/205* (2011.01)

(52) U.S. Cl.
CPC ......... *B60R 21/215* (2013.01); *B29C 45/14065* (2013.01); *B60R 21/205* (2013.01); *B60R 2021/21537* (2013.01)

(58) Field of Classification Search
CPC ................... B29C 45/1639; B29L 2031/3038
See application file for complete search history.

(56) References Cited

U.S. PATENT DOCUMENTS

| | | | |
|---|---|---|---|
| 6,524,505 B1 | 2/2003 | Bisognin et al. | |
| 2007/0205585 A1* | 9/2007 | Okada et al. | 280/728.3 |

FOREIGN PATENT DOCUMENTS

| | | |
|---|---|---|
| DE | 102006035208 A1 | 1/2008 |
| DE | 102007053995 A1 | 5/2009 |
| DE | 102010015256 A1 | 10/2011 |
| FR | 2927290 A1 | 8/2009 |
| WO | WO-98/31530 | 7/1998 |

\* cited by examiner

*Primary Examiner* — Alison L Hindenlang
(74) *Attorney, Agent, or Firm* — Miller, Matthias & Hull LLP

(57) ABSTRACT

A method for injection molding of an airbag case comprising a chute channel and a flap, with the chute channel being adapted to receive an airbag. The injection molding is carried out in a mold and comprises the following steps:
  arranging in the mold a net,
  manufacturing the flap and the chute channel by injecting plastic matter into the mold, by overmolding plastic matter on the net by manufacturing a continuity of material between the chute channel and the flap, with a portion of the net being isolated from the injected plastic material, in a closed protective space delimited between a wedge mobile and a first matrix of the mold.

An airbag case in particular manufactures with such a method and dashboard for a vehicle.

12 Claims, 3 Drawing Sheets

METHOD FOR INJECTION MOLDING OF AN AIRBAG CASE

CROSS-REFERENCE TO RELATED APPLICATIONS

This application claims priority under 35 USC §119 and the Paris Convention to French Patent Application No. FR 13 56018, filed on Jun. 24, 2013.

FIELD OF THE DISCLOSURE

This invention relates to methods for injection molding of an airbag case, to airbag cases and to a dashboard for a vehicle comprising such cases.

More precisely, this invention relates to a method for injection molding of an airbag case comprising a chute channel, a case and a net.

BACKGROUND OF THE DISCLOSURE

Publication DE102010015256 relates to a method for manufacturing an airbag case comprising a chute channel, a case and a net comprising a step of folding the net and a step of maintaining the folds of the net by the intermediary of an assembly element before the manufacturing of the flap and of the chute channel. The folded portion is intended to subsequently form a hinge between the flap and the chute channel. These types of manufacturing methods are already used and provide satisfaction. However, with a concern for reducing the risk of injury to the occupants of the vehicle while still reducing the number of manufacturing steps and the manufacturing time of these safety devices, this invention has objectives to improve this.

SUMMARY OF THE DISCLOSURE

According to a first aspect, this invention relates to a method for injection molding of an airbag case comprising a chute channel delimiting a recess at least partially closed by at least one flap, with the chute channel being adapted to receive an airbag, with the injection molding being carried out in a mould comprising at least first and second mould parts (also called first and second matrices) and a wedge movably mounted with regard to the first matrix, with the method comprising the following steps:
  arranging in the mould a net comprising a first portion, a second portion and a third portion, the third portion being located between the first and the second portion, with the first, third and second portions forming a continuous unit,
  manufacturing the flap and the chute channel by injecting plastic material into the mould, by overmolding plastic material respectively on the second portion of the net and on the first portion of the net, with a continuity of material between the chute channel and the flap, with the third portion of the net then being isolated from the injected plastic material, in a closed protective space delimited between the wedge mobile and the first matrix.

A method for the injection molding of an airbag case in few steps is thus obtained, wherein a sealed zone between the flap and the chute channel can be carried out while still providing a portion of the net as "protected", or in other terms not overmoulded adapted to form a hinge between the flap and the chute channel with a hinge axis mobile between the chute channel and the flap.

In some embodiments, a person of ordinary skill in the art might also use one or more of the following features taken individually or in combination:
  the wedge is movably mounted in translation with regard to the first matrix between a protective position, wherein the wedge and the matrix close the protective space, and an open position, wherein the wedge and the matrix do not close the protective space. The translation movement of the wedge is easily and quickly carried out for the insertion of the third portion of the net before the step of manufacturing the flap and the chute channel, and for the withdrawal of the third portion of the net after the step of manufacturing the flap and the chute channel;
  the first matrix comprises a first surface of the first matrix and the second matrix comprises a first surface of the second matrix, and the wedge comprises a support surface extending along a support direction which, during the step of manufacturing the flap and the chute channel, is substantially in the extension of the first surface of the first matrix and forms with the first surface of the first matrix and the first surface of the second matrix a cavity for the injection of plastic material in order to create the flap. A substantially continuous molding surface of the flap is as such created;
  the wedge further comprises a protective surface extending along a protective direction, the protective surface delimiting with a second surface of the first matrix the protective space, and the protective direction and the support direction form between them a non-zero angle between 10° and 80°, more preferably of a magnitude of 45°. In other terms the protective and support surfaces extend along two different directions making it possible to carry out a protective space that is not in the continuity of the support surface, and as such help to ensure the absence of injection of material in the matrix;
  the protective surface and the support surface of the wedge have a common edge intended to come facing an intermediate zone extending between the flap and the chute channel during the step of manufacturing the flap and the chute channel. The common edge makes it possible to define a precise zone of separation between the cavity wherein the plastic material is intended to be injected and the protective space, with this zone of separation being in the vicinity of the intermediate zone extending between the flap and the chute channel during the step of manufacturing the flap and the chute channel;
  the net comprises a first connecting portion between the first portion and the third portion of the net, and a second connecting portion between the third portion and the second portion of the net, and during the step of manufacturing the flap and the chute channel, the first connecting portion and the second connecting portion are pinched between the common edge and the second surface of the first matrix. In other terms, the "ends" of the third portion of the net directed on the one hand towards the first portion of the net and on the other hand towards the second portion of the net are clamped between the edge of the wedge and the first matrix and close the protective space;
  the third portion of the net forms a loop that extends longitudinally in the protective space over a certain length. This arrangement allows for the formation of an extra length of hinge in a reduced space;
  the protective surface comprises a projection and the distance between the projection and the common edge is substantially equal to the length of the loop. This arrangement allows sizing the length of the loop;

the chute channel comprises a lateral wall extending along a lateral direction and facing the recess, and a transverse wall extending along a transverse direction, the transverse wall extending substantially in the extension of the flap, with the lateral direction and the transverse direction forming together a non-zero angle, and wherein the net is overmolded in the lateral wall or in the transverse wall. The net is then retained either in the transverse wall of the chute channel (the lateral wall is then not overmoulded) or in the lateral wall (the transverse wall is then not overmoulded) and the risks of detachment of the net and of the chute channel in the case of deployment of the airbag are reduced;

by manufacturing the flap and the chute channel, a continuous or discontinuous line of least resistance and adapted to break facing an intermediate zone extending between the flap and the chute channel is formed. A line is carried out intended to break in case of release of the airbag and ensures a minimum of forces opposing the release of the flap during the deployment of the airbag.

This invention also relates to an airbag case, in particular carried out by a method such as described hereinabove, comprising:
a chute channel delimiting a recess closed by at least one flap, the chute channel being adapted to receive an airbag,
a net comprising a first portion, a second portion and a third portion, the third portion being located between the first and the second portion, with the first, third and second portions forming a continuous unit,
with the flap and the chute channel being respectively overmoulded by the injection of plastic material on the second portion of the net and on the first portion of the net, with a material continuity between the chute channel and the flap, and the third portion of the net, not overmoulded, extending in the recess.

Finally, this invention relates to a dashboard for a vehicle comprising an airbag case such as described hereinabove, an inner trim element forming a dashboard body, with the airbag case being fastened onto a surface of the dashboard body, and an airbag arranged in the recess of the chute channel.

BRIEF DESCRIPTION OF THE DRAWINGS

Other characteristics and advantages of the invention shall appear when reading the following description of one of its embodiments, provided way of a non-limited example, with regards to the attached drawings.

In the drawings.

In the various figures, the same references designate identical or similar elements.

DETAILED DESCRIPTION OF THE DISCLOSURE

Figure 1:
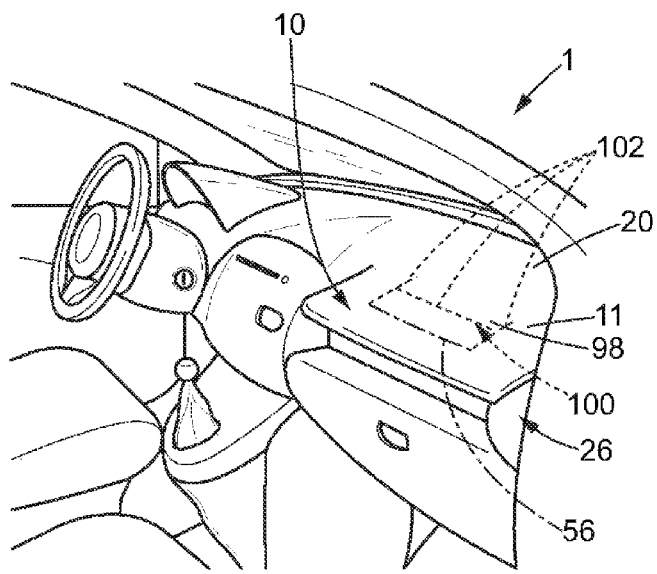
FIG. 1 is a schematic view in perspective of the passenger compartment of a vehicle provided with a dashboard comprising an airbag case comprising a net, a chute channel and a flap.

FIG. 1 schematically shows the passenger compartment of a vehicle 1 provided with a vehicle inner trim part.

As represented in FIG. 1, the inner trim part is a dashboard 10. However, in alternative embodiments, the inner trim part of the vehicle could be a door panel, a roof trim, a seat or any other type of trim element provided in the passenger compartment of a vehicle.

Figure 2:
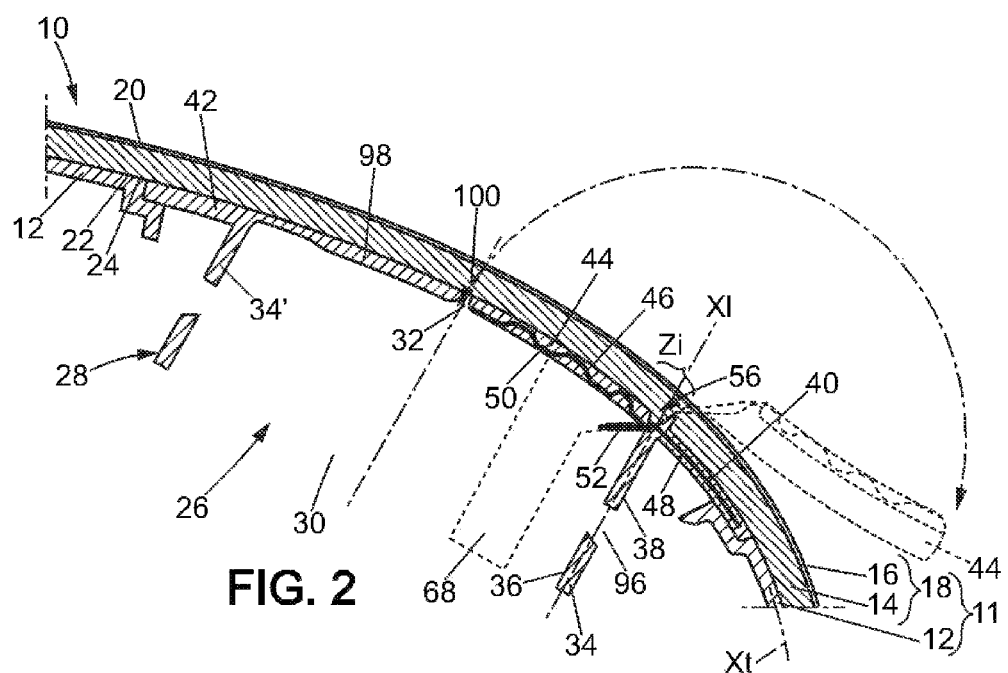
FIG. 2 is a schematic cross-section view of a dashboard comprising an airbag case according to the invention.

Advantageously, the dashboard 10 is a "foamed" board and comprises, such as shown in FIG. 2, a dashboard body 11 comprising a layer of rigid support 12, a layer of foam 14 and a skin 16 covering the layer of foam. The skin 16 and the layer of foam 14 form a covering 18 of the rigid support 12.

The skin 16 is one the side intended to be directed towards the passenger compartment of the vehicle. The skin 16 comprises an outer surface, this outer surface can be seen from the passenger compartment and forms the outer surface 20 of the covering 18. The covering 18 further comprises an inner surface 22, opposite the outer surface 20. The inner surface 22 is facing the layer of rigid support 12. More precisely, the inner surface 22 of the covering 18 is facing an outer surface 24 of the rigid support 12.

The rigid support 12 comprises for example an insert made of a rigid plastic material.

In alternative embodiments, the dashboard could be a dashboard referred to as "injected" comprised of a dashboard body constituting the sole element of the dashboard, or referred to as "thermo-cased" comprising a self-breakable skin covering the dashboard body.

An airbag case 26 is housed under the dashboard body 11. More precisely, the airbag case 26 is arranged between the dashboard body and an airbag (not shown).

Such as shown in FIG. 2, the airbag case 26 comprises a chute channel 28. The chute channel 28 delimits a recess 30. The recess 30 is adapted to receive an airbag. In a known manner, during the quick inflation of the airbag subsequent to an impact that the vehicle is subjected to, the airbag is deployed through an opening 32 of the recess 30 towards the inside of the passenger compartment.

The chute channel 28 comprises a lateral wall 34. The chute channel comprises as represented a second 34', a third and a fourth lateral wall that delimit the recess 30. The lateral wall 34 comprises an inner surface 36 directed towards the recess 30. The lateral wall further comprises an outer surface 38 opposite the inner surface 36. Here, the chute channel comprises a first transverse wall 40. The chute channel further comprises a second 42, a third and a fourth transverse wall extending substantially parallel to the covering 18 or to the rigid support 12. The chute channel 28 is for example made from thermoplastic elastomer. The lateral wall 34 extends according to a lateral direction X1 and the transverse wall 40 creates an angle with the lateral wall 34 and extends according to a transverse direction Xt.

The safety device 26 (airbag case 26) comprises a flap 44. The flap 44 comes to cover at least partially the opening 32 of the recess 30. In a preferred embodiment of the invention described hereinafter, the flap 44 comes to fully cover the opening 32 of the recess 30. This embodiment is particularly suited for so-called "foamed" dashboards. In "normal" use of the vehicle, namely the absence of impacts, the flap 44 closes the opening 32 of the recess 30. When an impact occurs, the airbag is deployed, comes into contact with the flap 44 and causes the opening of the flap 44, such as shown as dotted lines in FIG. 2. The flap 44 is connected to the chute channel 28 by a hinge connection that allows the pivoting of the flap 44 with regard to the chute channel 28 and limits the projection of the flap 44 in the passenger compartment 1. For instance, the flap 44 is made of the same material as the chute channel.

The safety device further comprises a net 46, more preferably flexible. The net 46 is assembled to the flap 44 and to the chute channel 28 and forms the hinge connection between these two members. More precisely, the net 46 comprises a first portion 48, a second portion 50 and a third portion 52. The third portion 52 is located between the first portion 48 and the second portion 50. The first, third and second portions 48, 50, 52 form a continuous unit. For example, the first, third and second portions 48, 50, 52 form a continuous sheet. The net 46 can be either textile, or metal, or any material that is sufficiently resistant. The term "net" designates a flexible material in the form of a sheet, for example woven or even knitted. The net can for example be made of an aromatic polyamide material (also called "aramid").

The chute channel 28 and the flap 44 are manufactured by overmolding on the net 46.

As described in more detail in what follows, the flap 44 and the chute channel 28 are manufactured, in an injection press, in a mould 54 by overmolding plastic material on the net 46. The flap 44 is created by overmolding plastic material on the second portion 50 of the net, and the chute channel 28 is manufactured by overmolding plastic material on the first portion 48 of the net. More precisely, the chute channel 28 is carried out by overmolding the transverse wall 40 of the chute channel on the second portion of the net. The lateral wall 34 of the chute channel 28 is not overmoulded on the net 46.

For instance, the chute channel 28 and the flap 44 form a single-block part (or are integral).

The airbag case 26 further comprises a line of least resistance 56. The line of least resistance 56 is arranged between the flap 44 and the transverse wall 40 of the chute channel 28. The line of least resistance 56 is continuous. For example the line of least resistance 56 is formed by a notch or a continuous groove. In an alternative embodiment, the line of least resistance is discontinuous. For example the line of least resistance is formed by a plurality of notches that are discontinuous in relation to one another.

The line of least resistance 56 forms an area intended to be broken, or torn during the deployment of the airbag subsequent to an impact.

Figure 3A:
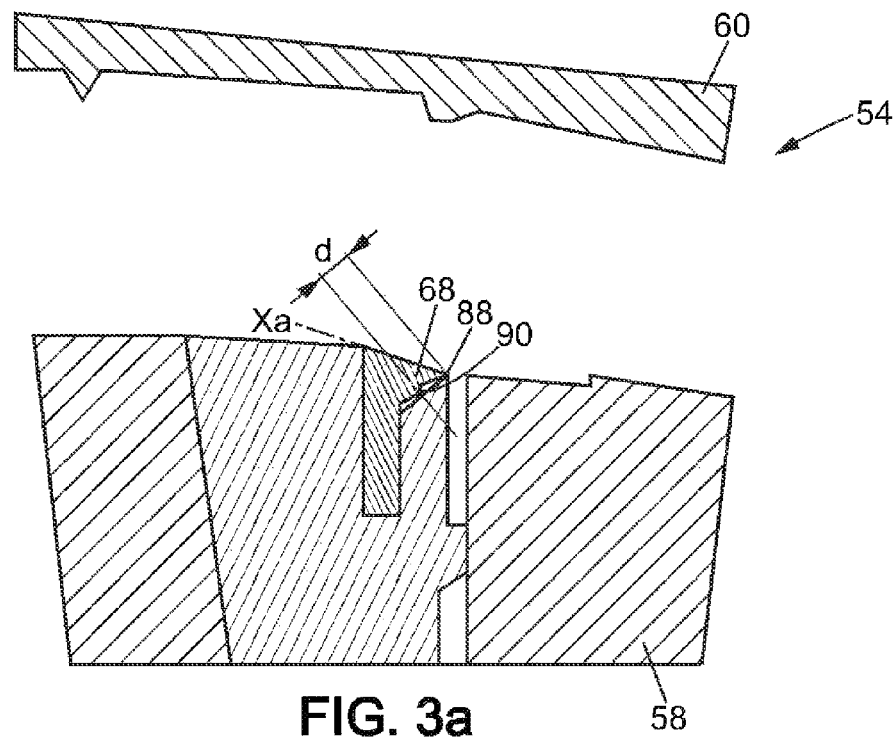
FIGS. 3a to 3d are schematic cross-section views of successive steps of setting in place in a mould of a net before manufacturing the flap and the chute channel of the airbag case of FIG. 2 by injecting plastic material into the mould.

As shown in FIG. 3a, the mould 54 comprises a first matrix 58 (or first mould part) and a second matrix 60 (or second mould part). The first and second matrices 58, 60 are adapted to cooperate together and define by closing on one another a first cavity 62 for the injecting of plastic material for the creation of the flap 44. The first and second matrices 58, 60 define a second cavity 64 for the injecting of plastic material for the manufacturing of the transverse wall of the chute channel. The first and second matrices 58, 60 defining a third cavity 66 for the injecting of plastic material for the manufacturing of the lateral wall 34 of the chute channel 28. The first, second and third cavities 62, 64, 66 cooperate together in such a way that the chute channel and the flap form a single-block part.

The mould 54 further comprises a wedge 68, such as shown in FIGS. 2 and 3a, movably mounted in relation to the first matrix 58. The wedge 68 and the first matrix 58 delimit a protective space E. Here, the wedge 68 is movably mounted in translation along a wedge direction Xc between a protective position, wherein the wedge 68 and the first matrix 58 close the protective space E, and an open position, wherein the wedge 68 and the first matrix 58 do not close the protective space.

The wedge 68 comprises a guide surface 70 for its guiding in translation or sliding in a housing 72 provided in the first matrix 58.

The wedge 68 further comprises a support surface 74 extending according to a support direction Xa. The support surface 74 is, during the creation of the flap 44 and of the chute channel 28 or, in other terms when the wedge 68 is in its protective position, substantially in the extension of a first surface of the first matrix 76 and forms with the first surface of the first matrix 76 and a first surface of the second matrix 78 the first cavity 62 for the injection of plastic material for the creation of the flap.

The wedge 68 further comprises a protective surface 80 extending globally according to a protective direction Xp, the protective surface 80 delimiting with a second surface of the first matrix 82, the protective space E. The protective direction Xp and the support direction Xa form between them a non-zero angle between 10° and 80°, more preferably of a magnitude of 35°.

The support surface 74 of the wedge 68 extends along the support direction Xa between a first end 84 adjacent to the first surface of the first matrix 76 and a second end 86. The second end 86 of the support surface 74 constitutes an end of the protective surface 80. In other terms, the protective surface 80 and the support surface 74 have a common edge 88.

The protective surface 80 comprises at a distance d from the common edge 88 along the protective direction Xp a projection 90 directed towards the second surface of the first matrix 82. The protective space E extends in length between the projection 90 and the common edge 88 and in width between the protective surface 80 and the second surface of the first matrix 82.

In protective position of the wedge 68, the common edge 88 is adapted in order to be substantially located facing an intermediate zone Zi extending between the flap 44 and the chute channel 28, during the step of manufacturing the flap 44 and the chute channel 28. The common edge 88 is also adapted to come and pinch the net 46 and isolate from the plastic material injected into the mould the third portion 52 of the net 46 in the protective space E in protective position of the wedge 68.

Such as shown in the FIGS. 2 and 3a to 3d, the third portion 52 of the net 46 forms a loop (or, in other terms is folded) and comprises a first connecting portion 92 between the first portion 48 and the third portion 52 of the net, and a second connecting portion 94 between the third portion 52 and the second portion 50 of the net 46. The first connecting portion 92 and the second connecting portion 94 form the ends of the third portion 52 of the net 46.

The FIG. 3a shows the mould 54 alone in open position with the wedge 68 in protective position.

Figure 3B:
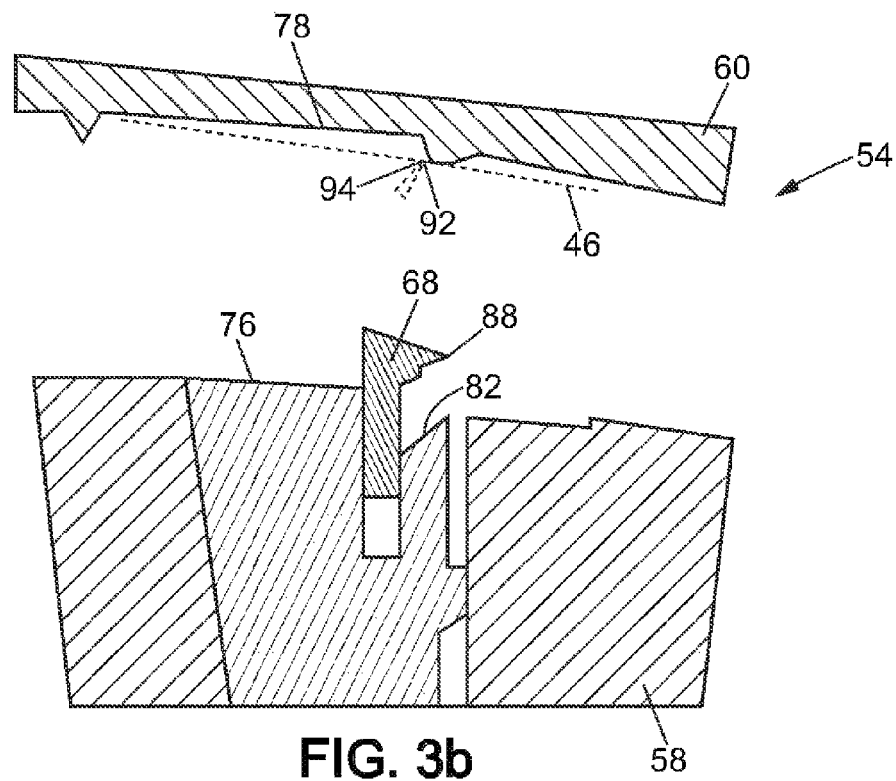

During the setting into place of the net 46 into the mould 54 in a preceding step of the manufacturing of the flap and of the chute channel, the wedge 68, mobile with regard to the first matrix 58, such as shown in FIG. 3b, is first displaced in such a way as to open the protective space E.

Figure 3C:
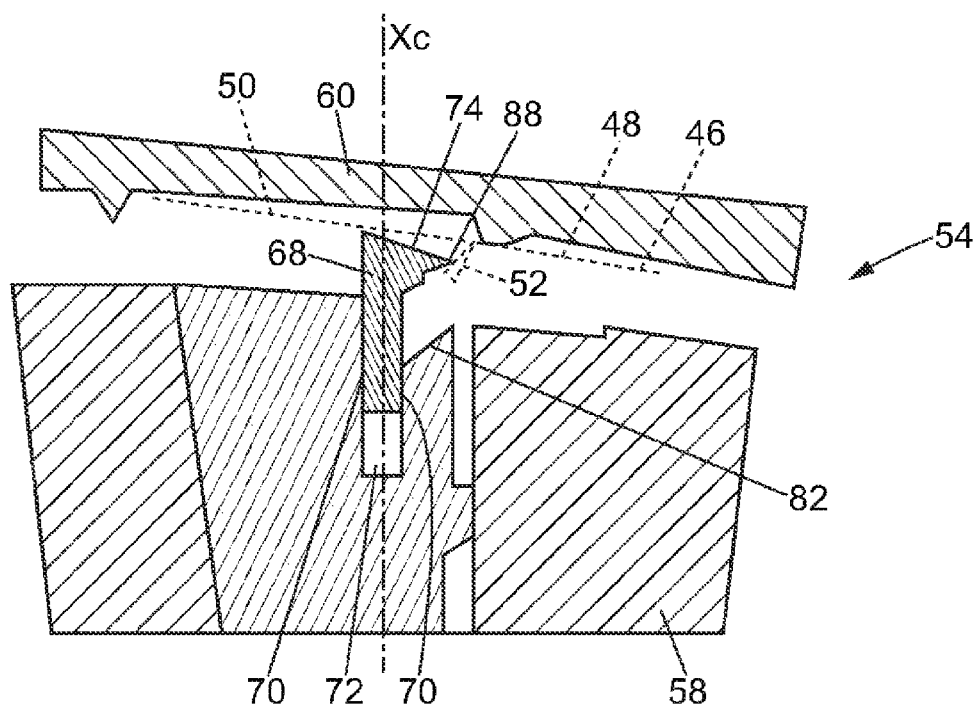
Figure 3D:
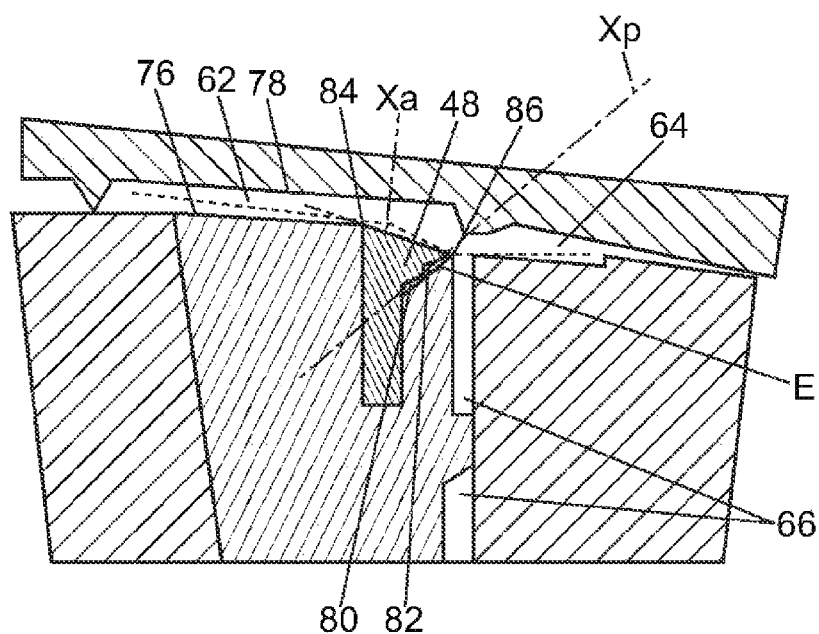

As shown in FIG. 3c, then subsequently the first portion 48 of the net 46 is arranged facing surfaces of first and second matrices 58, 60 intended to form the second cavity 64. The second portion 50 of the net 46 is also arranged facing first surfaces of first and second matrices 76, 78 intended to form the first cavity 62. Furthermore, the third portion of the net 46 is arranged which, for instance, forms a loop as described hereinabove, in the protective space E which is open. In an alternative embodiment of the invention, the first portion 48 of the net 46 is arranged in the third cavity 66 in such a way as to extend in the lateral wall 34, with the second and third portion 50, 52 of the net 46 being arranged in a similar manner in the first cavity 62 and the protective space E.

The last step in the setting in place of the net 46 (or of protecting the third portion of the net from the material to be injected), is the displacement of the wedge 68 from its open position to its protective position in such a way as to close the protective space E by pinching the first connecting portion 92 and the second connecting portion 94 between the common edge 88 and the second surface of the first matrix 82.

The airbag case 10 is then subsequently created by closing the mould 54 then by injecting, preferentially during the same step of molding, plastic material into the first, the second and the third cavity 62, 64, 66 of the mould in such a way as to respectively form the flap 44, the lateral wall 34 of the chute channel and the transverse wall 40 of the chute channel 28.

Finally, the airbag case 10 is unmolded, or removed from its mould 54. For example the first matrix 58 is made in several portions that are mobile in relation to one another in order to carry out the unmolding.

The third portion 52 of the net 46, as shown in FIG. 2 is not overmoulded and has not been rigidified or made integral with the flap 44 and/or with the chute channel 28 during the manufacturing of the flap 44 and of the chute channel 28.

The third portion 52 of the net 46 then forms, as shown in FIG. 2 a loop between the flap 44 and the chute channel 28 which carries out the function of a hinge. The third portion 52 of the net 46 extends longitudinally substantially 45° from the lateral direction X1 and from the transverse direction Xt. During the deployment of the airbag, the flap 44 tilts in the passenger compartment 1 of the vehicle about an unfastened transverse axis formed by the third portion 52 of the net 46, which allows for greater freedom of movement, less stress on the flap 44, less risk of breakage of the flap 44, and subsequently a decrease in the risk of projection of parts into the passenger compartment of the vehicle. Furthermore, the third portion 52 of the net 46 provides an easy adjusting of the length of the hinge.

The airbag case 26 is then fastened by the intermediary in particular of the transverse walls 40 of the chute channel 28 onto the rigid support 12. The fastening is carried out via welding. In an alternative embodiment, the fastening can be carried out by snap-fitting. Advantageously, the airbag case 26 is fastened either onto the outer surface 24 of the rigid support 12, in particular in the case of a so-called "foamed" dashboard as shown in FIG. 2, or onto the inner surface of the rigid support 12 opposite the outer surface 24, in particular in the case of a dashboard referred to as "injected" or "thermo-lined".

The covering 18 then comes to cover the unit formed by the rigid support 12 fastened to the airbag case 26. The unit formed by the covering 18, the airbag case 26 and the rigid support 12 is adapted to assemble therein an airbag in the recess 30.

The airbag is for example fastened to the airbag case by the intermediary of hooks for example provided to cooperate with an orifice 96 of the lateral wall 34 of the chute channel 28.

Such as shown in FIGS. 1 and 2, the airbag case 26 further comprises a second flap 98. The flap 44 and the second flap 98 are arranged to fully close the opening 32. Such as shown, the flap 44 and the second flap 98 are adjacent in relation to one another and the interface between the two flaps corresponds to a central zone 100 of a line of weakness 102 (shown as a dotted line in FIG. 1). Furthermore, the line of weakness 102 extends on either side of the central zone 100 in such a way as to form a an H substantially delimiting the two flaps 44, 98.

The second flap 98 is connected to the chute channel by a hinge connection. Such as shown in FIG. 2, the hinge connection can consist in a hinge-film formed by a thinning of material forming an interface between the second flap 98 and the chute channel 28 (the second flap 98 and the chute channel 28 being made of a single part (are integral)).

For encumbrance and safety reasons, the second flap 98 is located on the windscreen side of the vehicle, while the flap 44 is located on the passenger side of the vehicle.

However, in an alternative embodiment, the second flap 98 is connected to the chute channel by a hinge connection substantially identical to that described hereinbelow for the flap 44. Preferentially, the second flap 98 is formed with the chute channel 28 during the same step of molding.

In alternative embodiments of the invention, a single flap 44 covering partially or entirely the opening 32 of the recess 30 can be provided, and for example the line of weakness can have the shape of a "U".

The invention claimed is:

1. A method for injection molding of an airbag case comprising a chute channel delimiting a recess at least partially closed by at least one flap, the chute channel being adapted to receive an airbag, with the injection molding being carried out in a mould comprising at least first and second matrices and a wedge movably mounted with regard to the first matrix, with the method comprising the following steps:
arranging in the mould, a net comprising a first portion, a second portion and a third portion, with the third portion being located between the first and the second portion, with the first, third and second portions forming a continuous unit, the third portion of the net forming a loop and comprising a first connecting portion between the first portion and the third portion of the net, and a second connecting portion between the third portion and the second portion of the net, manufacturing the flap and the chute channel by injecting plastic material into the mould, by overmolding plastic material respectively on the second portion of the net and on the first portion of the net, with a continuity of material between the chute channel and the flap, with the third portion of the net then being isolated from the injected plastic material, in a closed protective space delimited between the wedge movably mounted and the first matrix, wherein the wedge is movable between a protective position, wherein the wedge and the first matrix close the protective space, and an open position, wherein the wedge and the first matrix do not close the protective space, and wherein the displacement of the wedge from its open position to its protective position closes the protective space by pinching the first connecting portion and the second connecting portion between the wedge and the first matrix.

2. The method according to claim 1, wherein the wedge is movably mounted in translation with regard to the first matrix between the protective position, wherein the wedge and the first matrix close the protective space, and the open position, wherein the wedge and the first matrix do not close the protective space.

3. The method according to claim 1, wherein the first matrix comprises a first surface of the first matrix and the second matrix comprises a first surface of the second matrix, and the wedge comprises a support surface extending according to a support direction which, during the step of manufacturing the flap and the chute channel, is substantially in the extension of the first surface of the first matrix and forms with the first surface of the first matrix and the first surface of the second matrix a cavity for the injection of plastic material for the manufacturing of the flap.

4. The method according to claim 3, wherein the wedge further comprises a protective surface extending globally along a protective direction, the protective surface delimiting with a second surface of the first matrix the protective space, and the protective direction and the support direction form between them a non-zero angle between 10° and 80°.

5. The method according to claim 4, wherein the protective surface and the support surface of the wedge have a common edge intended to come facing an intermediate zone extending between the flap and the chute channel during the step of manufacturing the flap and the chute channel.

6. The method according to claim 5, wherein the net comprises a first connecting portion between the first portion and the third portion of the net, and a second connecting portion between the third portion and the second portion of the net, and during the step of manufacturing the flap and the chute channel, the first connecting portion and the second connecting portion are pinched between the common edge and the second surface of the first matrix.

7. The method according to claim 6, wherein the third portion of the net forms a loop that extends longitudinally in the protective space over a certain length, and wherein the protective surface comprises a projection and the distance between the projection and the common edge is substantially equal to the length of the loop.

8. The method according to claim 1, wherein the chute channel comprises:

a lateral wall extending along a lateral direction and facing the recess, and a transverse wall extending along a transverse direction, the transverse wall extending substantially in the extension of the flap, with the lateral direction and the transverse direction forming between each other a non-zero angle, and wherein the net is overmolded in the lateral wall or in the transverse wall.

9. The method according to claim 1, wherein by manufacturing the flap and the chute channel, a continuous or discontinuous line of least resistance and adapted to break facing an intermediate zone extending between the flap and the chute channel is formed.

10. An airbag case, manufactured by a method comprising:

arranging in the mould, a net comprising a first portion, a second portion and a third portion, with the third portion being located between the first and the second portion, with the first, third and second portions forming a continuous unit, the third portion of the net forming a loop and comprising a first connecting portion between the first portion and the third Portion of the net, and a second connecting portion between the third portion and the second portion of the net, manufacturing the flap and the chute channel by injecting plastic material into the mould, by overmolding plastic material respectively on the second portion of the net and on the first portion of the net, with a continuity of material between the chute channel and the flap, with the third portion of the net then being isolated from the injected plastic material, in a closed protective space delimited between the wedge movably mounted and the first matrix, wherein the wedge is movable between a protective position, wherein the wedge and the first matrix close the protective space, and an open position, wherein the wedge and the first matrix do not close the protective space, and wherein the displacement of the wedge from its open position to its protective position closes the protective space by pinching the first connecting portion and the second connecting portion between the wedge and the first matrix, wherein the airbag case comprises:

a chute channel delimiting a recess closed by at least one flap, the chute channel being adapted to receive an airbag, a net comprising a first portion, a second portion and a third portion, the third portion being located between the first and the second portion, with the first, third and second portions forming a continuous unit, with the flap and the chute channel being respectively overmoulded by injecting plastic material over the second portion of the net and over the first portion of the net, with a continuity of material between the chute channel and the flap, and the third portion of the net, not overmoulded, extending in the recess, wherein the chute channel and the flap are in one continuous piece, and the first and second portions of the net being insert-molded in the chute channel and the flap.

11. A dashboard for a vehicle comprising an airbag case comprising:

a chute channel delimiting a recess closed by at least one flap, the chute channel being adapted to receive an airbag, a net comprising a first portion, a second portion and a third portion, the third portion being located between the first and the second portion, with the first, third and second portions forming a continuous unit, with the flap and the chute channel being respectively overmoulded by injecting plastic material over the second portion of the net and over the first portion of the net, with a continuity of material between the chute channel and the flap, and the third portion of the net, not overmoulded, extending in the recess, wherein the chute channel and the flap are in one continuous piece, the first and second portions of the net being insert-molded in the chute channel and the flap, an inner trim element forming a dashboard body, with the airbag case being fastened onto a surface of the dashboard body, and an airbag arranged in the recess of the chute channel.

12. The method according to claim 3, wherein the wedge further comprises a protective surface extending globally along a protective direction, the protective surface delimiting with a second surface of the first matrix the protective space, and the protective direction and the support direction form between them an angle of a magnitude of 45'.

* * * * *